May 20, 1958     E. BAŞ-TAYMAS     2,835,837

ELECTRON GUN FOR PRODUCING AN ELECTRON BEAM

Filed Feb. 11, 1954

Inventor:-
Enis Baş-taymas,
by Pierce, Scheffler & Parker,
attorneys.

United States Patent Office 2,835,837
Patented May 20, 1958

2,835,837
ELECTRON GUN FOR PRODUCING AN ELECTRON BEAM

Enis Bas-Taymas, Zurich, Switzerland, assignor to Gesellschaft zur Forderung der Forschung an der Eidg. Techn. Hochschule, Zurich, Switzerland Application February 11, 1954, Serial No. 409,626

Claims priority, application Switzerland February 13, 1953

2 Claims. (Cl. 313—82)

The present invention relates to an electron gun for producing an electron beam, particularly for cathode-ray tubes for the projection of television pictures, the gun being of the triode type consisting of a cathode, anode and a control electrode therebetween for establishing between the control electrode and the anode an electrostatic acceleration field for the electron stream emitted by the cathode.

As is well-known, with cathode-ray tubes the production of an electron beam takes place in vacuum. But in spite of this, gas molecules will always be present in such a tube. These gas molecules are ionized by electrons of the cathode-ray and accelerated by the electrostatic field used in forming and focusing the electron beam. Depending whether such ions are positive or negative, they may fall on the cathode or on the fluorescent screen respectively, where they cause destructive effects.

According to the invention the electrostatic arrangement serving for producing an electron beam is such that the ions produced by the electron beam are deflected from the orbit of the electrons to prevent their destructive action.

The object of the invention is an electron gun of the triode type adapted to produce an electron beam, having a cathode, control grid (Wehnelt cylinder) and anode, in which both the planes of the anode as well as the plane of the cathode and control grid are inclined toward each other.

Further features of the invention will appear from the description, claims and accompanying drawing which diagrammatically represents some preferred forms of embodiment incorporating the invention.

Figure 1:
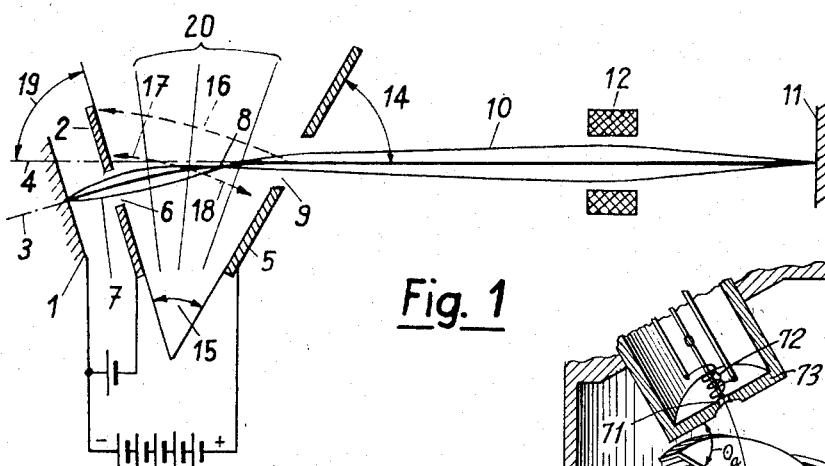
Figure 3:
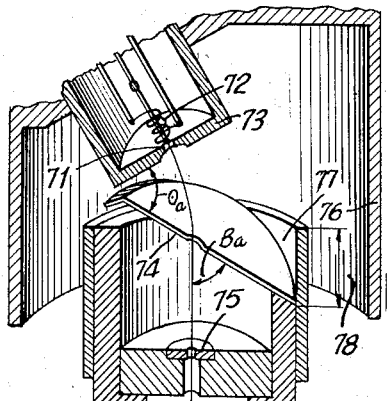
Figure 2:
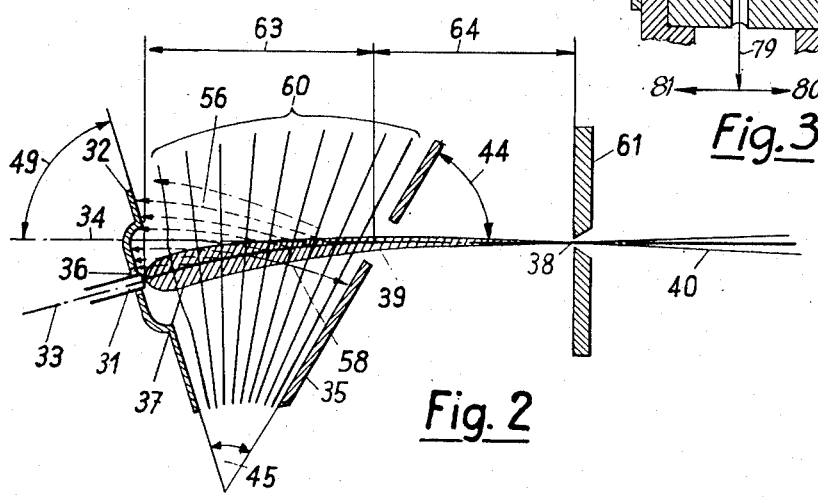

In said annexed drawing:

Figs. 1 to 3 are special forms of embodiment of the electrode arrangement according to the invention, in diagrammatic representation.

The arrangement as in Fig. 1 shows a special form of the invention, as it is for instance employed in a television tube. The electron gun serving to produce the electron beam includes a planar cathode 1 having the control grid (Wehnelt cylinder) 2 in front thereof. Situated opposite the control grid is the anode 5 which, as represented, possesses a high positive potential with respect to the cathode or control grid. According to the intended use, this system may be singly symmetrical, i. e. designed as a cylinder lens, or rotation-symmetrical, i. e. formed as a spherical lens, whereby, in the case as in Fig. 1, the rotation-symmetrical arrangement will generally be employed.

By means of the electron gun formed of cathode, control grid and anode, an electron beam 7 will then be produced which passes through the aperture 9 of the anode and impinges, at the end of this path, on screen 11. Generally, for producing a small spot, a lens 12 will be used which focuses on the projection screen the narrowest cross-section 8 of the electron beam, the so-called crossover.

According to the invention, the plane of the cathode 1 and control grid 2 and the plane of the anode 5 include together an angle 15. In the particular case of Fig. 1 the planes are inclined in opposite directions to the axis 4 of the cathode-ray tube, i. e. the anode through the angle 14 and the control grid through the angle 19.

In the potential field existing between anode and control grid, i. e. the electrostatic electron accelerating field between and directly adjacent the planar portions of the control grid 2 and anode 5, the equipotential planes 20 are inclined toward each other, i. e. they all pass through the intersecting straight line common to the anode and control grid planes. In consequence of the equipotential planes the produced electron beam is bent between control grid and anode.

Such inclined arrangement of control grid and anode renders extremely useful services in eliminating the ions produced by the electrons of the electron beam without the necessity to employ any magnetic field. The positive ions, as is well-known, have an injurious action which is all the greater, the more they become accelerated by the high electric potential serving to produce the electron beam, and impinge on the cathode at the speed thus acquired. Through this positive ion bombardment the cathode may be destroyed in a comparatively short time.

As stated hereinbefore, the injurious action is all the greater, the greater the potential available for the ions will be. It will be clearly seen that, in the arrangement as in Fig. 1, the ions produced in the vicinity of the aperture 9 of anode 5 are chiefly responsible for the destruction of the cathode through the ion bombardment, as they practically pass through the whole potential drop of the acceleration field, prior to impinging on the cathode.

But, according to the invention, just these ions are eliminated in a particularly simple and elegant manner through the inclined arrangement of anode and cathode. The initial acceleration of the ions produced by the electron beam takes place in the direction of the field gradient at the origin of the ions, since their initial velocity may practically be considered as nil. According to their polarity, the positive ions move in the direction of the arrows 16, and 17, and the negative ions take the path indicated by arrow 18, thus especially the ions produced in the regions of higher potential will neither reach the cathode nor the projection screen.

Fig. 2 illustrates a further special form of embodiment being distinguished from the arrangement of Fig. 1 in that the narrowest constriction—the crossover 38—is situated behind the anode 35. The forward part of the bolt-shaped cathode 31 protrudes through an aperture in the control grid 32 whose face is curved to obtain the required focusing of the electron beam. The planes of the control grid 32 and anode 35 are inclined toward each other, that is again in opposite directions to the axis 34 of the cathode-ray tube: the anode through the angle 44 and the cathode through the angle 49. Due to the inclination of the equipotential planes 60 of the potential field the ions produced in the electron beam, again following the potential drop, will be accelerated in the direction of the arrows 56 or 58, whereby the major part of the positive ions will impinge on the control grid and not on the cathode, thus preventing any damage to the cathode.

Behind the anode 35, at the location of the narrowest constriction 38 of the electron beam there is the so-called crossover diaphragm 61, through which the outer portions of the electron beam are masked off to thus attain a particularly sharp concentration of the electron beam 40.

Such electrode arrangement is incorporated in the television projection sets made known under the name Eidophor as fully disclosed, for instance in the U. S. Patent No. 2,644,938, Hetzel et al., granted July 7, 1953. In these projection arrangements, for the control of light within a schlieren-optical system use is made of a liquid layer, preferably a thin oil layer. But the presence of this oil layer or film within the vacuum vessel entails an inferior vacuum which is by one or more orders of magnitude poorer than the vacuum usually attainable in high-vacuum tubes employing getter. Such appliances lack a fluorescent screen so that in this case the protection of the cathode from ion bombardment is of prime importance. In electron guns which are intended to produce highly intense electron beams, it is necessary that besides maintaining of the emissive power of the cathode, also the emissive surface undergoes no deformation whatever. But with the presence of positive ions, even in the case of a solid metallic cathode, the emissive surface will be rapidly destroyed through the ion bombardment. As a consequence, the current density in the electron beam will drop rapidly.

On the other hand, when adopting the arrangement according to the invention as in Fig. 2, no important ion bombardment of the cathode will take place, since all energy-laden positive ions will move in the paths designated 56 and fall on the control grid. The elimination of the ions is thus achieved without impairing the faultless focusing necessary for producing high current densities in the electron spot.

Due to its simple design, the arrangement according to the invention still involves the great merit that the electron and ion paths to be expected by calculation can be determined with great certainty so as to make it possible, without time-consuming experimental preliminary trials, to ascertain for every application the required inclination of cathode system and anode.

Small deviations of the direction of the electrode beam from the calculated value may be corrected by choosing suitable dimensions of the screens surrounding the electron gun. This is represented in detail in Fig. 3, where 71 represents a bolt-shaped cathode, which is bombarded and thus heated by electrons emitted by a heating helix 72. 73 represents a control grid, 74 an anode and 75 a cross-over stop. The entire system is completely secreened by a cylinder 76, which has the potential of the cathode or of the control-grid. The cylindrical electrode 77, which will be referred to below as "second secreening cylinder" extends from the side of the anode towards the cathode and has the potential of the anode and thus can be considered as a cylindrical portion of anode 74. The plane of the control grid is inclined to the plane of the anode by an angle $\theta_a$ (corresponding to angle 15 of Fig. 1, and to angle 45 of Fig. 2). The electron beam 79 after passing through the anode stop 74 is inclined to the plane of the anode by an angle $\beta_a$ (corresponding to angle 14 of Fig. 1, and to angle 44 of Fig. 2). In the ideal case, viz. that the planes of anode and control grid are of infinite extent the following relation exists between $\theta_a$ and $\beta_a$ $$\operatorname{ctg} \beta_a = 0.666\theta_a + 0.084\theta_a^3$$

As the marginal condition of an infinite extent of the planes of control grid and anode cannot be realized in practice, the electron beam will issue from the anode at an angle more or less deviating from the angle calculated for an electron gun designed according to the above relation. If the system is fitted with screens as above described this deviation is very small and may be completely corrected by suitably choosing the length 78 of the second cylinder 77. If this length 78 of cylinder 77 is increased, the direction of the equipotential planes within the acceleration field is modified in such a manner, that the electron beam is deviated in direction of arrow 80; if, inversely, length 78 is decreased, the beam is deviated in direction of arrow 81.

In constructing a system according to the invention, the angle between control grid and anode planes may be freely chosen as it determines the extent to which the ions should be eliminated. From Fig. 2 it may be readily seen that the proportion of the ions impinging on the control grid surface is all the greater, the greater the angle 45 will be. The angles of both planes with the axis will then result from the other demands on the electron arrangement and they should generally be determined in such a way that the main body of the beam tangentially contacts the axis of the cathode-ray tube approximately in the plane of the anode.

It will be understood that the arrangement hereinbefore described for separating ions and electrons is not confined to the application in cathode-ray tubes for television purposes. In this case, the particular forms of embodiment as in Figs. 1 and 2 will in general be chosen, in which the plane of the control grid (and the cathode) and the plane of the anode are inclined in opposite directions to the axis of the cathode-ray tube. But the invention is not limited to this special case, since the essential inventive concept resides in the inclination of the plane of the control grid in relation to the plane of the anode by which is effected elimination of the ions from the electron beam. The invention may also be advantageously applied wherever the production of sharply concentrated electron beams is essential, especially in cases, in which the emissive power of the cathode should as far as possible be taken advantage of. Such highly charged cathodes are in general very sensitive to ion bombardment. But this source of disturbances can be obviated in a simple and elegant manner by applying the arrangement according to the invention.

What I claim is:

1. In a cathode-ray tube, an electron gun of the triode type for producing an electron beam, said gun consisting of a cathode having a planar electron emitting portion, an anode spaced from said cathode and a control electrode located intermediate said cathode and anode, both said control electrode and said anode including a planar portion for producing directly therebetween an electrostatic electron accelerating field and said planar portions being provided with apertures for the passage of the electron beam, the planar portion of said control electrode being parallel to said electron emitting portion of said cathode, and the planar portions of said control electrode and said anode being inclined in opposite directions to the axis of the electron beam established subsequent to passage through the aperture in said anode whereby said electrostatic accelerating field exhibits equipotential planes inclined with respect to said planar electron emitting portion of said cathode.

2. In a cathode-ray tube, the invention as recited in claim 1, and wherein said anode also includes a cylindrical portion mounted substantially coaxially with said axis of the electron beam, said cylindrical portion surrounding partially said inclined planar portion of said anode and extending axially beyond said inclined portion of said anode towards said control electrode for some distance so as to effect an angular correction of the electron beam passing through the aperture in said anode.

References Cited in the file of this patent

UNITED STATES PATENTS

| | | |
|---|---|---|
| 2,151,158 | Schröter | Mar. 21, 1939 |
| 2,340,594 | Jonker | Feb. 1, 1944 |
| 2,407,906 | Rose | Sept. 17, 1946 |
| 2,496,127 | Kelar | Jan. 31, 1950 |
| 2,573,287 | Szegho | Oct. 30, 1951 |
| 2,658,160 | Peterman | Nov. 3, 1953 |
| 2,661,436 | Van Ormer | Dec. 1, 1953 |
| 2,719,243 | Hoagland | Sept. 27, 1955 |
| 2,727,171 | De Gier | Dec. 13, 1955 |